Nov. 8, 1960     H. B. VINCENT     2,959,493
TREATING SEALING EDGES OF GLASS PARTS
Filed Aug. 23, 1956
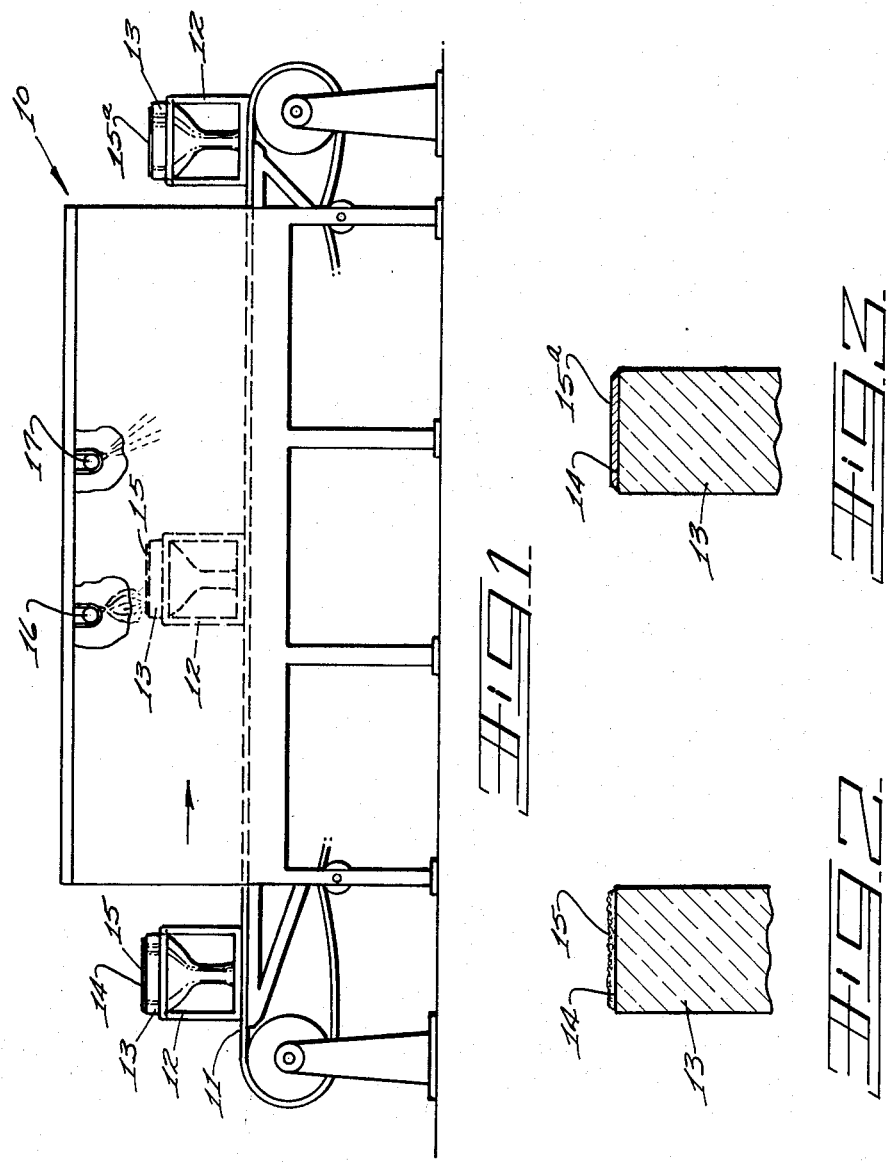
INVENTOR.
HARVARD B. VINCENT
BY W. A. Schaich &
Leonard D. Soubier

United States Patent Office 2,959,493
Patented Nov. 8, 1960

2,959,493

TREATING SEALING EDGES OF GLASS PARTS

Harvard B. Vincent, Toledo, Ohio, assignor to Owens-Illinois Glass Company, a corporation of Ohio Filed Aug. 23, 1956, Ser. No. 605,762

3 Claims. (Cl. 117—43)

This invention relates to the treatment of sealing areas of glass bodies and more specifically to treating the sealing edges of prefabricated hollow glass parts with a low-melting sealant for the purpose of placing the sealing areas in proper form for subsequent joining to complementary sealing surfaces of other glass or metal parts. This invention is particularly related to the preparation of preformed rigid glass parts for integration into a separable cathode-ray tube envelope for color television transmission reception.

The sealing surfaces of glass parts such as face plate or funnel portions of a cathode-ray picture tube envelope may be individually coated with a suitable vitreous sealing material capable of forming a hermetic seal therewith. The vitreous sealing material consists of enamels or brazing or solder glasses having relatively low-melting temperatures in comparison with similar properties of the parent glass parts. The sealing material by necessity must be taken to elevated temperatures for best adherence to the glass to form a durable, hermetic bond. The sealing material thus applied serves as a low-melting sealing glass for uniting glass-to-glass or glass-to-metal component parts to constitute a vacuum-tight tube enclosure.

In the application of such a sealing material to the sealing edges of glass parts it is necessary to heat the parent glass above its strain and annealing point temperatures to obtain the desired adherence of sealing material. The sealing material usually cannot be applied by ordinary methods without at least some distortion, deformation and/or strain being introduced into the parts. The application of heat is often permitted to proceed into a substantial portion of the glass body to permit one or more of the above objectionable conditions to occur on cooling.

Where an edge portion of the glassware is simply heated to a temperature substantially above its strain point with the remainder of the ware held at a lower temperature to permit handling, serious difficulties may be experienced. When the ware is uniformly cooled it will frequently have an unacceptably high tension strain in the neighborhood of the open edge and may break. Often the particular glass part is incapable of resisting even mild forms of shock on cooling and is entirely unsuited to sealing. If the piece of ware is annealed, the temperatures required for release of strain in the glass body may cause distortion of the sealing edge.

Accordingly, it is an object of the present invention to provide a method of applying a low-melting sealing composition as a coating to the sealing surfaces of preformed glass parts by avoidance of breaking stresses in the coated areas of said parts.

Another object of the present invention is to provide a method of thermally adhering a low-melting glass sealing composition to the sealing edges of rigid hollow glass parts by proper temperature control to minimize the creation of distortion and strain in the parts to thereby eliminate annealing.

It is a further object of the present invention to provide a method of permanently bonding a coating of low-melting sealant to sealing surfaces of parent glass parts by localized heat treatment to furnish an acceptably low-strain pattern in the treated parts.

The specific nature of this invention, as well as other objects and advantages thereof, will become apparent to those skilled in the art from the following detailed description, taken in conjunction with the annexed sheet of drawings on which, by way of preferred example only, is illustrated the preferred embodiment of this invention.

Figure 1 is an elevational view of apparatus and cathode-ray tube parts for practicing the subject invention.

Fig. 2 is an enlarged vertical sectional view of the sealing edge of a tube part prior to treatment.

Fig. 3 is a view similar to Fig. 2 of the tube part after treatment.

In the preferred embodiment of the present invention a lehr 10 is provided for heat treating the glassware. Lehr 10 has a continuous moving belt 11 upon which is conveyed a series of racks 12 designed to support the glassware. The glassware consists of cones or funnels 13 for cathode-ray picture tubes which are frusto-conical in shape and composed of glass. The funnels 13 are prefabricated in separate operations which are known in the art with substantially planar sealing surfaces 14. Sealing surfaces 14 are endless, annular regions which may be ground substantially flat in a grinding operation for butt-sealing to similar surfaces having essentially matching contours. The overall contour of the funnels 13 at their sealing edges is generally rectangular or circular encompassing the known forms of cathode-ray picture tubes such as employed in black and white reception. Funnels 13 are supported in racks 12 with their annular sealing surfaces 14 retained upright in a horizontal plane for movement through lehr 10 on belt 11.

The sealing surface 14 are coated with a layer of sealing composition 15 in granular form which may be applied to the glass at room temperatures in combination with a suitable vehicle such as alcohol or a solution of methacrylate resin. The coating is effected to produce a layer of temporarily adherent sealing composition 15 over the surfaces 14 to be butt-sealed. Sealing composition 15 is applied to the sealing edges of each of the funnels 13 prior to their introduction into lehr 10. Sealing composition 15 consists of a brazing or solder glass having chemical and physical properties which are compatible with the parent glass of funnels 13. Sealing composition 15 has substantially lower softening and melting temperatures than the parent glass. Examples of such sealing compositions are fully disclosed in the copending application of Francl and Hagedorn entitled "Low Temperature Glass Sealing Composition," Serial No. 554,753, filed December 22, 1955, and now abandoned, said application having been assigned to the assignee of the present application.

In said application S.N. 554,753, typical compositions suitable for use in the present invention are disclosed, such compositions including those of Table I, as follows:

Table I

|  | A | B | C | D | E | F | G | H | I | J |
|---|---|---|---|---|---|---|---|---|---|---|
| PbO | 71 | 71 | 71 | 71 | 72 | 71 | 70 | 68.4 | 71.4 | 70 |
| $B_2O_3$ | 17 | 17 | 17 | 17 | 19 | 20 | 15 | 18.6 | 19.6 | 14 |
| ZnO | 9 | 9 | 9 | 9 | 9 | | 9 | | | |
| CdO | | | 1.5 | 3 | | | | | | |
| CuO | 3 | | | | | 9 | | | | |
| $Ag_2O$ | | 3 | 1.5 | | | | 6 | | | |
| ZnO +CuO (combined) | | | | | | | | 13 | 9 | 16 |
| Fiber Softening Point, ° F | 765 | 738 | 752 | 769 | 801 | 792 | 756 | 794 | 795 | 735 |
| Coefficient of Contraction × $10^{-7}$ (250° C.–0° C.) | 90.0 | 90.6 | 90.0 | 90.0 | 90.6 | 89.6 | 89.8 | 88.3 | 90.0 | 90.0 |

The new sealing composition will consist of the four component elements PbO, $B_2O_3$, ZnO and CuO in the combinations and percentages disclosed in Table I and falling within the ranges disclosed in Table II below. The preferable sealing composition is that shown in composition "A" of Table I and this composition should provide a glass or product having a fiber softening point within the range of from 758 to 772° F. and a coefficient of contraction from 250° C. to 0° C. of from 88 to 92×$10^{-7}$ cm. per cm. per ° C. Other constituents may be added or may replace either the copper (CuO) or the zinc (ZnO) such as illustrated by compositions C, D, and G respectively in Table I above. Other minor constituents may include such common glass constituents as $F_2$ or the alkali oxides $Na_2O$ or $K_2O$ in amounts of approximately 1%.

Table II

|  | Percent |
|---|---|
| PbO | 67–73 |
| $B_2O_3$ | 14–21 |
| ZnO | 0–11 |
| CdO | 0–10 |
| CuO | 0–10 |
| $Ag_2O$ | 0–5 |
| Fiber softening point ° F. | 600–850 |

Such sealing compositions may be used with various types of lead or lead-free type compositions of glass as well as other glasses designed specifically for cathode ray or light transmitting tubes or articles. Typical of such glass compositions with which this sealing glass may be used are those illustrated in Table III here below:

Table III

|  | A | B | C |
|---|---|---|---|
| Silica ($SiO_2$) | 63.0 | 68.0 | 70.0 |
| Alumina ($Al_2O_3$) | 1.2 | 1.5 | 4.2 |
| Sodium ($Na_2O$) | 7.0 | 6.5 | 17.6 |
| Potassium ($K_2O$) | 10.0 | 11.0 | 1.1 |
| Barium (BaO) | 9.6 | 12.0 | 0.5 |
| Lead (PbO) | 7.6 | | |
| Calcium Oxide (CaO) | 1.0 | | 6.6 |
| Antimony ($Sb_2O_3$) | .1 | .5 | |
| Fluorine ($F_2$) | .5 | .5 | |
| Coefficient of Expansion × $10^{-7}$ (Between 0–300° C.) | 101.4 | 101.7 | 102.5 |

Table III above illustrates three compositions of glass with which these sealing glasses may be utilized and in particular the sealing compositions A and D respectively of Table I are highly compatible with these three compositions. It is understood that these various sealing compositions may be used also with other compositions of base glass.

A preferable sealing composition 15 which may be employed has a fiber softening point temperature in the range of from about 400–600° C. and coefficients of thermal expansion and contraction which are in proper agreement with the parent glass within acceptable limits. The parent glass may have a coefficient of thermal expansion in the range of from 80–110×$10^{-7}$ with sealing composition 15 in agreement therewith.

The funnels 13 in their supporting racks 12 are transported through lehr 10 at a uniform rate of speed during which travel they are initially subjected to gradually increasing preheating temperatures. The preheating rate and temperature level may be varied widely depending upon the distinctive characteristics and composition of funnels 13. When funnels 13 have been uniformly heated to a temperature level of the order of approximately 240° C., for example, and less than approximately 600° C. or less than the annealing temperature of the particular glass composition, their sealing surfaces 14 bearing sealing composition 15 are passed under a manifold burner 16. Burner 16 is located so that its flame may be directly applied to the coated edges to raise the temperature of the glass edges to a range of from approximately 450° C. to approximately 1000° C. for a short period of time. This temperature is generally above the strain and annealing point temperatures of the parent glass. The temperature of the glass edges is preferably raised to about 820° C. to fully melt sealing composition 15a thereover with molecular diffusion of the two materials into each other to obtain a chemical bond therebetween. The diffusion essentially consists of transference of at least a portion of the parent glass into the sealing composition.

The flame application is immediately followed by lowering the temperature of the coated edges with a cooling medium to prevent the inherent heat within melted sealing composition 15a and at the surfaces of the glass from elevating the temperature of any appreciable portion of glass funnel 13. As stated, when substantial portions of the glass edges are heated above strain and annealing point temperatures, breaking stresses may be developed on cooling.

To prevent this a stream of cooling air at atmospheric temperature is directed at the glass edges from air manifold 17 placed in near relationship to manifold burner 16. The impinging air blast is sufficient to lower the edge temperatures to near or within the preheating range below the annealing and strain point temperatures of the glass to equalize temperatures within the funnel 13. Control over the cooling of the glass may be obtained by properly directing the air stream to the inner or outer surfaces of the edges as desired. Each of the glass funnels 13 is then further reduced in temperature gradually and at a controlled rate to atmospheric during continued movement through and out of lehr 10.

The out-of-flat condition of the funnel edges is considerably reduced by the subject method. Without the cooling medium applied after flame treatment the glass parts average 0.015 inch out-of-flat. By employing the air blast immediately after flame treatment the out-of-flat condition averages 0.007 inch. The tension strain in the edges is lowered to a point where breakage is not attributable thereto. Deformation and distortion are eliminated so that the funnels may be utilized in picture tube fabrication without annealing or reshaping. The method may be similarly applied to tube face plates on which sealing composition is desired.

Sealing composition 15 may also be applied to the glass by dipping the edges into the composition in molten form in the temperature range of from approximately 450° C. to approximately 1000° C. after the part is preheated as above. The edges may then be subjected to a cooling medium such as an air blast following the dipping operation to cool the edges. Comparable results may thus be achieved.

Other forms of cooling the glass edges may be employed such as dipping the hot coated areas into a suitable liquid held at a temperature in the preheating range. The coated edges may also be placed in contact with a thermally conductive metallic plate to flatten the softened sealing composition and to remove heat from the glass edges.

It will, of course, be understood that various details of the subject method and apparatus may be modified through a wide range without departing from the principles of this invention, and it is, not the purpose to limit the patent granted hereon otherwise than necessitated by the scope of the appended claims.

I claim:

1. The method of bonding a low-melting sealing composition to the annular sealing edges of a hollow glass body without annealing for subsequent fabrication into a cathode-ray tube envelope, which method comprises the steps of applying a coating of low-melting glass sealing composition to annular sealing edges of said glass body, preheating said glass body at a controlled rate to a temperature below its annealing point temperature and not in excess of 600° C., subjecting said sealing edges and said coating only to a localized elevated temperature in the range of from approximately 450° C. to approximately 1000° C. to thermally diffuse the molecules of the parent glass into said sealing composition, immediately subjecting said coated annular sealing edges to a stream of cooling air to equalize temperatures between said coated sealing edges and the remainder of said glass body below the annealing point temperature of the latter, and cooling said glass body at a controlled rate to atmospheric temperature with minimal stresses therein.

2. The method of adhering a low-melting sealing composition to the sealing surface of a preformed hollow glass part without annealing for subsequent fabrication into a cathode-ray tube envelope, which method comprises the steps of preheating said glass part at a controlled rate to a temperature below its annealing point temperature and not in excess of approximately 600° C., applying a coating of low-melting glass sealing composition to the annular sealing edges of said glass part by dipping said edges into said sealing composition in molten form and in the temperature range of from approximately 450° to approximately 1000° C., the temperature of the glass part being maintained not in excess of the annealing temperature thereof, immediately subjecting the coated annular sealing edges to a stream of cooling air to equalize temperatures in the area of said coated sealing edges without inducing strains therein, and cooling said glass part at a controlled rate to atmospheric temperature.

3. In a method of bonding a low melting sealing composition to the annular sealing edges of a hollow annealed glass body without subsequent re-annealing for subsequent fabrication into a composite article, said body being preheated at a controlled rate to a temperature below its annealing point temperature and not in excess of 600° C., the preheated body having its annular sealing edges bearing a layer of the low melting sealing composition, the steps of locally heating said sealing edges and said coating only to an elevated temperature in the range of from approximately 450° C. to approximately 1000° C. to thermally diffuse the molecules of the parent glass into said sealing composition, immediately cooling said coated annular sealing edges to equalize the temperatures of said coated edges and of the remainder of said glass body at a temperature below the annealing point temperature of the glass body, and cooling said glass body at a controlled rate to atmospheric temperature with minimal stresses therein.

References Cited in the file of this patent

UNITED STATES PATENTS

| | | |
|---|---|---|
| 1,562,341 | Knight | Nov. 17, 1925 |
| 1,577,581 | Knight | Mar. 23, 1926 |
| 2,149,246 | Zimmerman et al. | Feb. 28, 1939 |
| 2,215,027 | Blau | Sept. 17, 1940 |
| 2,238,153 | Blau | Apr. 15, 1941 |
| 2,643,020 | Dalton | June 23, 1953 |
| 2,749,668 | Chaffotte et al. | June 12, 1956 |

FOREIGN PATENTS

| | | |
|---|---|---|
| 656,805 | Great Britain | Sept. 5, 1951 |